Jan. 30, 1962     R. A. McCREANOR ET AL     3,018,656
METHOD FOR IDENTIFYING DEFECTS IN WELDED TUBING
Filed June 25, 1959
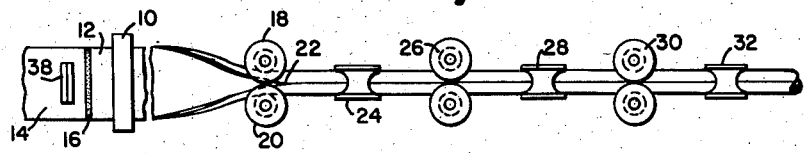
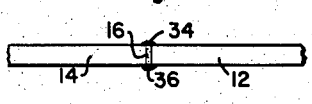
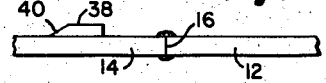
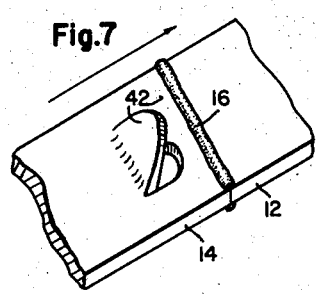
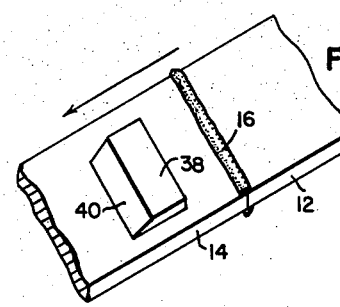
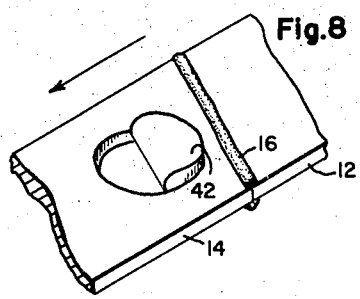
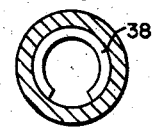
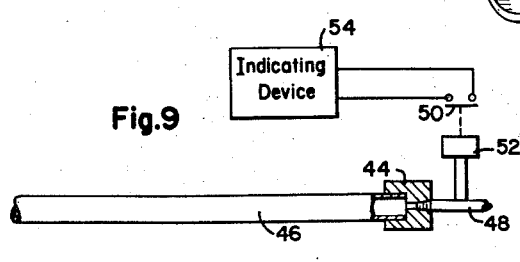
INVENTORS
Richard A. McCreanor &
Russel L. Uphoff
BY
ATTORNEY United States Patent Office 3,018,656
Patented Jan. 30, 1962

3,018,656
METHOD FOR IDENTIFYING DEFECTS IN WELDED TUBING
Richard A. McCreanor, Pittsburgh, and Russel L. Uphoff, Murrysville, Pa., assignors to Jones & Laughlin Steel Corporation, Pittsburgh, Pa., a corporation of Pennsylvania
Filed June 25, 1959, Ser. No. 822,834
7 Claims. (Cl. 73—37)

This invention relates to a method for determining the location of defects in welded tubular products formed from flat strip, and more particularly to a method for locating the position of butt welds which join successive lengths of strip from which the tubular products are formed.

During the manufacture of continuous butt welded tubing, successive lengths of flat strip (called "skelp") are welded together end-to-end into a continuous article which is thereafter formed into tubing. The joint between the successive lengths, known as a butt weld, protrudes from the surface of both sides of the strip such that when the tubing is formed, an annular discontinuity appears on the inner periphery of the tube. If the finished tube is used as an electrical conduit, for example, its inside surface must be painted; and the presence of the butt weld impairs the painting operation. Similarly, if the finished tube is used to convey fluids, the discontinuity caused by the butt weld will restrict, to some extent, the flow of fluid through the tube; and, more importantly, it will impair the mechanical properties of the finished product. Consequently, tube lengths containing a butt weld must be detected and discarded as scrap.

Due to the fact that the outside of the tube passes through pressure rolls during the forming process, the weld bead or projection between successive lengths of strip is flattened on the outside of the tube and, consequently, is difficult to detect. The bead on the inside of the tube, however, does not pass through rolls so that it is possible to detect it visually by inspecting the inside of the tube. This method, however, is unsatisfactory since the weld bead is rather small and difficult to see with the result that certain of the tube lengths containing butt welds may be shipped to the customer as prime product.

It is an object of our invention to provide a method for readily detecting the position of butt welds between successive lengths of skelp in tubular articles. In one embodiment of the invention, hereinafter described, we secure a tab or relatively large projection adjacent the butt weld on the side of the skelp which forms the inside of the tube prior to the tube forming operation. Thus, when the skelp is formed into a tube, the aforesaid large projection is readily visible, and the problem of detecting the butt weld on the inside of the tube is eliminated.

Another object of our invention is to provide a method for detecting tubular sections containing butt welds or other defects wherein a relatively large projection is formed adjacent a butt weld on the side of the skelp which forms the inside of a continuous tubular article, and fluid under pressure is thereafter forced through the respective tubular sections cut from the tubular article. If a tubular section contains a projection, the back pressure of the fluid will increase, and this increased back pressure may be measured to indicate the presence of a butt weld or other defect. The invention is in this way very adaptable to a conventional tube manufacturing process wherein fluid under pressure is normally forced through the tube sections to blow out metal chips and other extraneous particles.

The above and other objects and features of our invention will become apparent from the following detailed description taken in connection with the accompanying drawings wherein:

FIGURE 1 is a schematic illustration of a welding and reducing mill for forming a continuous tubular article from skelp;

FIG. 2 is a side view of a butt weld which joins successive sections of skelp used in the apparatus of FIG. 1;

FIG. 3 is a side view of one embodiment of the invention wherein a projection is welded adjacent a butt weld to the side of the skelp which forms the inside of the tube;

FIG. 4 is a perspective view of the embodiment of the invention shown in FIG. 3;

FIG. 5 is a cross-sectional view of a formed tube containing the projection shown in FIGS. 3 and 4;

FIG. 6 is a broken away perspective view of the projection within a formed tube, the said projection being the same as that shown in FIGS. 3–5;

FIG. 7 is a perspective view of another embodiment of the invention wherein a projection is formed adjacent a butt weld by punching a tab in the skelp;

FIG. 8 is a view of the embodiment shown in FIG. 7 after passing through the pinch rolls of the apparatus of FIG. 1; and FIG. 9 is a schematic illustration of one type of apparatus which may be used to detect butt welds or other defects in welded tubing by measuring the amount of back pressure produced when fluid pressure is forced through a welded tube.

Referring to FIG. 1, the welding and reducing mill shown comprises a pair of pinch rolls, generally indicated at 10, through which flat skelp passes prior to the forming operation. As shown, successive sections of the flat strip or skelp 12 and 14 are welded together by means of a butt weld 16. After passing through pinch rolls 10, the continuous strip formed from sections 12 and 14 is passed through a heating furnace, not shown, where the temperature of the strip is raised to the range of about 2200 to 2600° F. The strip then passes through forming rolls 18 and 20 which are designed to bend the strip into an open-sided oval. Generally, a nozzle, not shown, located at 22 applies a jet of air or air-oxygen mixture onto the strip edges to maintain the proper welding temperature. The hot strip then passes through the second or welding stand comprising a pair of rolls 24 each of which is rotatable about a horizontal axis, it being understood that only one of the rolls 24 is shown in the view of FIG. 1. As the strip passes through rolls 24, its edges are squeezed together to form a weld. The formed tube thereafter passes through a series of reducing rolls 26, 28, 30 and 32 as the diameter of the tube is further reduced. As will be understood, the forming, welding, and reducing rolls, with individual motor drives for each roll, form alternate vertical and horizontal passes for the tube.

Since the tube forming process is continuous, the tubular article formed must be cut into sections of predetermined length. This may be done, for example, by a flying hot saw or other similar device located to the right of rolls 32 as shown in FIG. 1. Although the embodiment shown in FIG. 1 comprises an arrangement wherein the heat of the strip itself causes the edges to weld, the invention is equally applicable to other welding methods such as electrical resistance welding wherein the strip or skelp is not heated prior to passage through the forming rolls.

Referring to FIG. 2, the butt weld 16 formed between sections 12 and 14 produces beads or projections 34 and 36 on either side of the strip. Bead 36 on the side of the strip which forms the outside of the completed tubular article is flattened during passage through the forming and welding rolls; however, bead 34 on the side of the strip which forms the inner periphery of the tube does not pass through forming rolls. Consequently, tubular sections containing this bead must be rejected as scrap.

In accordance with the embodiment of our invention shown in FIGS. 3 and 4, we weld a projection 38 onto the continuous strip in close proximity to the butt weld 16. The direction of strip movement is shown in FIG. 4 by the arrow. Thus, in order to insure easy passage through the pinch rolls 10, the projection 38 is provided with a beveled surface 40 which causes one of the pinch rolls to gradually rise and pass over the projection.

Since the projection 38 is on the side of the strip which forms the inside of the completed tubular article, the cross section of a tubular member containing a butt weld will appear as in FIG. 5 wherein the projection 38 forms a restriction within the tube. This restriction is shown more clearly in FIG. 6. The outside of the tube is smooth and the weld bead does not appear due to passage through the forming and welding rolls. However, the projection 38 on the inside of the tube may be readily detected by visual inspection. In actual practice, the respective tubular sections cut from the continuous article formed in the welding process may be individually examined, and any section containing a projection 38 is rejected as containing a butt weld.

Referring to FIGS. 7 and 8, another embodiment of our invention is shown wherein a tab 42 is punched in either one of the strip sections 12 or 14 instead of welding a projection onto the strip. In FIGS. 7 and 8 the direction of strip movement is again shown by the arrows. It will be noted that the tab 42 is punched such that as the strip moves through pinch rolls 10 it will be bent over as shown in FIG. 8. After passage through the forming, welding and reducing rolls of the apparatus of FIG. 1, the aperture formed by the tab 42 will normally weld together and close. However, whether the aperture completely welds together or remains open is immaterial since the tube section containing the tab must be eventually rejected. The presence of a butt well in a tube section may then be detected in the same manner as was the butt weld in the embodiment shown in FIGS. 3–6, namely, by visual inspection.

Although visual inspection may be used in the manner described above to detect the presence of the projection within a tube section, the apparatus of FIG. 9 may also be used equally as well. Normally, after the ends of a finished tube are threaded or otherwise finished, the interior of the tube must be blown out with a jet of fluid under pressure. Thus, a sealing head 44 is passed over the end of a tube 46 and air under pressure is forced into the tube through conduit 48. If there are no projections within tube 46, the pressure in conduit 48 will be relatively low. However, if a projection such as projection 38 or 42 exists in the tube 46, the back pressure in conduit 48 will increase. This back pressure will cause switch 50, operated by diaphragm 52 or other similar device connected to the conduit 48, to close. Closure of the switch 50 then completes an electrical circuit in a device 52 which indicates to an operator, either visually or audibly, that the tube contains a projection and a butt weld.

Still another method for detecting the presence of a projection within the tube is to pass a drifter rod through the tube. The drifter rod has a plug at its forward end having a diameter slightly smaller than the inside diameter of the tube. Thus, if the drifter rod will not pass through the tube it will be apparent that the tube contains a projection and a butt weld.

Although our invention has been shown in connection with a certain specific embodiment, it will be readily apparent to those skilled in the art that various changes in form and arrangement of parts may be made to suit requirements without departing from the spirit and scope of the invention. In this respect, it is apparent that the invention could also be used to identify defects in the skelp other than butt welds.

We claim as our invention:
1. A method for detecting the presence of defects which are not readily discernible in welded tubing formed from flat strip, which comprises the steps of producing a raised discontinuity adjacent a defect on the side of the flat strip which forms the inside of the tube, said raised discontinuity being large enough to be readily detected within the subsequently formed tubing, forming the strip into a continuous welded tubular article, cutting said continuous tubular article into sections of predetermined length, and detecting the tubular section containing the aforesaid discontinuity whereby the section containing the discontinuity may be rejected as scrap.

2. A method for detecting the presence of defects in welded tubing formed from flat strip, which comprises the steps of forming a projection on the flat strip in close proximity to a defect, said projection being large enough to be readily detected within the subsequently formed tubing, forming the strip into a continuous welded tubular article, cutting said continuous tubular article into sections of predetermined length, and inspecting the respective tubular sections to detect the tubular section containing the aforesaid projection.

3. A method for detecting the presence of defects in welded tubing formed from flat strip, which comprises the steps of welding a projection in close proximity to a defect on the side of the strip which forms the inside of the tube, forming the strip into a continuous welded tubular article, cutting said continuous tubular article into sections of predetermined length, and inspecting the inside of the respective tubular sections to locate the tubular section containing the aforesaid projection.

4. A method for detecting the presence of defects in welded tubing formed from flat strip, which comprises the steps of punching a tab in said flat strip in close proximity to a defect such that the tab will project from the side of the strip which forms the inside of the tube, forming the strip into a continuous welded tubular article, cutting said continuous tubular article into sections of predetermined length, and forcing fluid under pressure through the respective tubular sections such that the presence of a tab in a tubular section will be indicated by an increase in back pressure at the end of the section through which the fluid enters.

5. In the method for detecting the presence of defects in welded tubing formed from flat strip, the steps of forming a projection on the side of the flat strip which forms the inside of the tubing in close proximity to a defect prior to the strip's being formed into a tubular article, said projection being large enough to be readily detected within the subsequently formed tubing, and forcing fluid through the tubular article after it is formed and welded whereby the location of a defect will be indicated by an increase in back pressure at the end of the tubular article through which the fluid enters.

6. A method for manufacturing welded tubing from lengths of flat strip, which comprises the steps of butt welding successive lengths of strip end-to-end to form a continuous strip, forming a projection adjacent the butt weld on the side of the strip which forms the inside of the tube, said projection being large enough to be readily detected within the subsequently formed tubing, forming the strip into a continuous tubular article in which the edges of the strip are welded together, cutting said continuous tubular article into sections of predetermined length, forcing fluid under pressure through each of said sections, and detecting any increase in back pressure above normal at the end of each tubular section through which fluid enters, the arrangement being such that a tubular section containing a projection will cause the back pressure at said end of the section to increase.

7. A method for manufacturing welded tubing from lengths of flat strip, which comprises the steps of butt welding successive lengths of strip end-to-end to form a continuous strip, welding a projection onto the side of the strip which forms the inside of the tubing in close proximity to said butt weld, forming the strip into a continuous tubular article, cutting said continuous tubular article into sections of predetermined length, and inspecting the inside of each of said sections whereby the section containing a butt weld will be easily detected by the presence of said projection.

References Cited in the file of this patent

UNITED STATES PATENTS

| | | |
|---|---|---|
| 1,982,408 | Wotachek | Nov. 27, 1934 |
| 2,024,485 | Sussman | Dec. 17, 1935 |
| 2,333,252 | Ikert | Nov. 2, 1943 |
| 2,394,466 | Muddiman | Feb. 5, 1946 |